Figure 1:
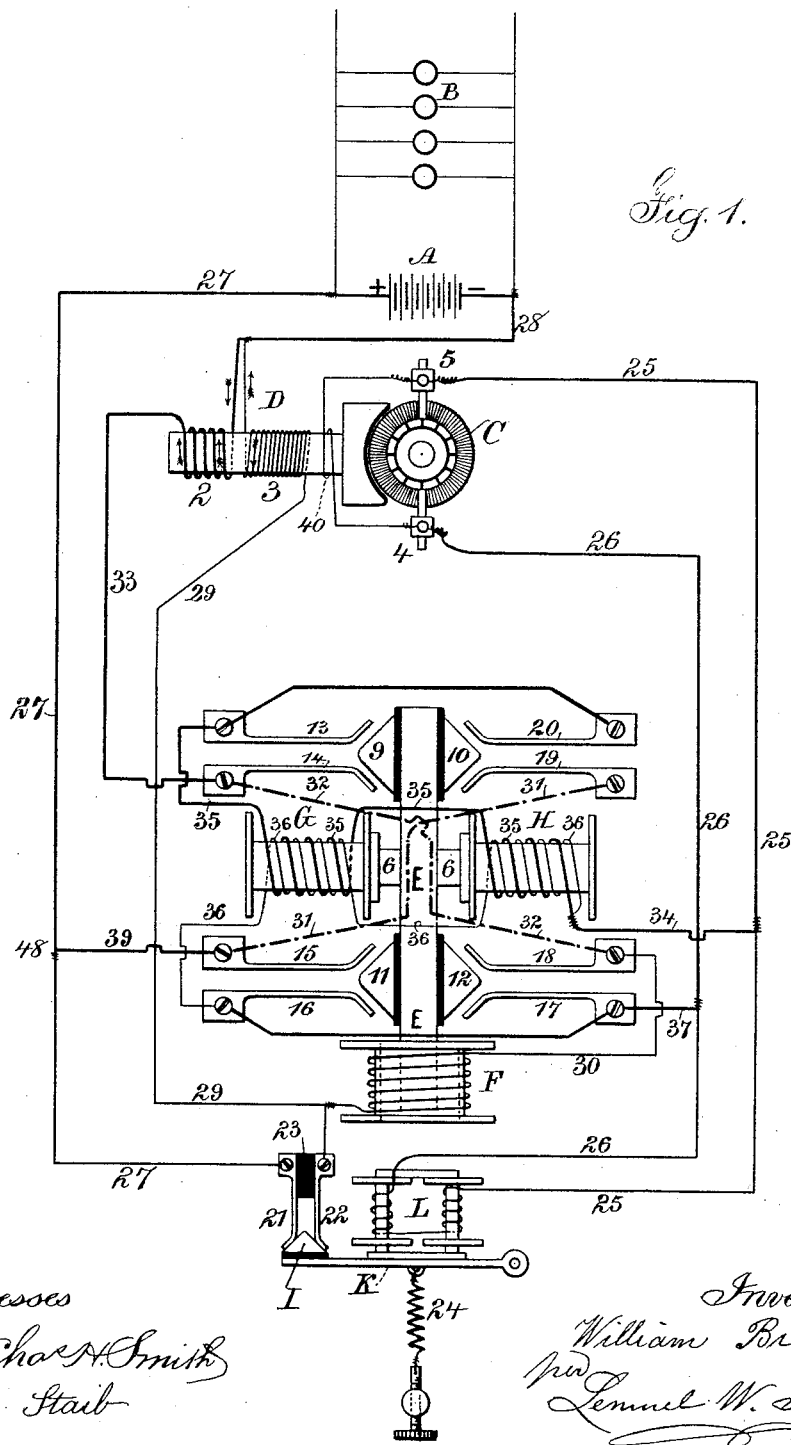

(No Model.) 2 Sheets—Sheet 1.
W. BIDDLE.
ELECTRIC CAR LIGHTING APPARATUS.

No. 531,764. Patented Jan. 1, 1895.

Witnesses
Chas. H. Smith
J. Staib

Inventor
William Biddle
per Lemuel W. Serrell
Atty.

(No Model.) 2 Sheets—Sheet 2.
W. BIDDLE.
ELECTRIC CAR LIGHTING APPARATUS.
No. 531,764. Patented Jan. 1, 1895.
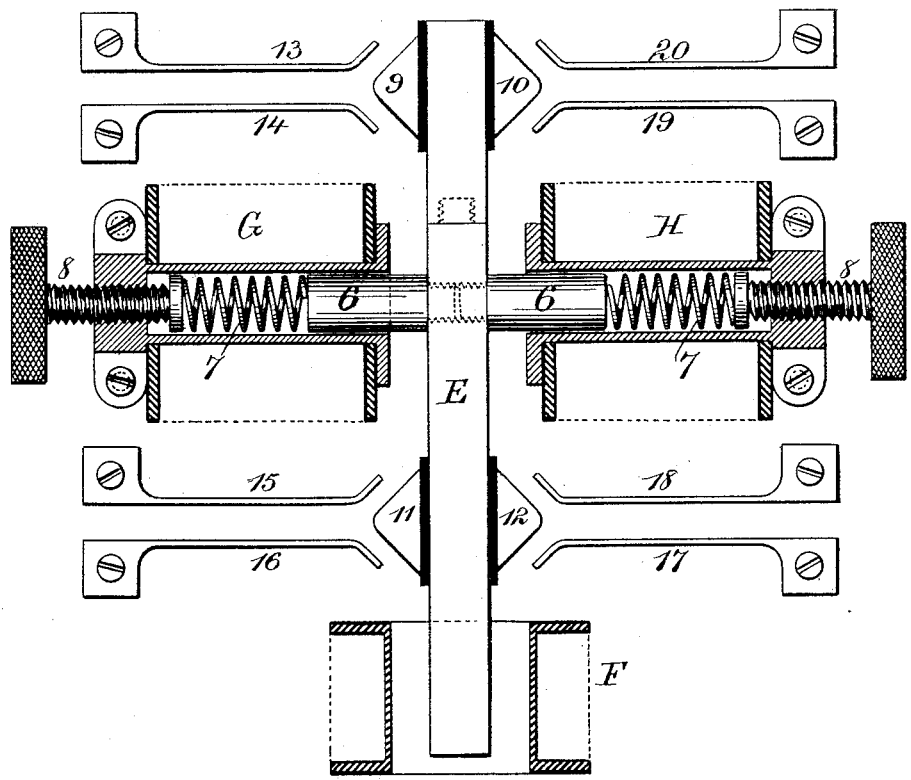
Witnesses
Chas H. Smith
J. Staib
Inventor
William Biddle
per Lemuel W. Serrell
Atty.

UNITED STATES PATENT OFFICE.

WILLIAM BIDDLE, OF BROOKLYN, NEW YORK.

ELECTRIC CAR-LIGHTING APPARATUS.

SPECIFICATION forming part of Letters Patent No. 531,764, dated January 1, 1895.

Application filed May 8, 1894. Serial No. 510,450. (No model.)

*To all whom it may concern:*

Be it known that I, WILLIAM BIDDLE, a citizen of the United States, residing at Brooklyn, in the county of Kings and State of New York, have invented an Improvement in Electric Car-Lighting Apparatus, of which the following is a specification.

Dynamo electric machines have heretofore been made in which there is a reverse winding in the field magnets for a neutralizing current, the object being to regulate the electric energy as required in the working circuit, and in some instances a dynamo has been applied in connection with a storage or secondary battery or plating tank in such a way that the circuit of the dynamo has been broken when the potential of the battery has equaled or nearly so that of the dynamo in order to prevent a reverse current passing from the secondary battery through the dynamo.

In car lighting by electricity several difficulties are experienced. The speed of the car varies and consequently the electromotive force of the dynamo varies correspondingly, and frequently a car is running at a high speed and the dynamo driven thereby under ordinary circumstances will develop a corresponding increase in electromotive force, and that frequently occurs when the lights are not in use and the secondary battery is fully charged.

To adapt a system of electric lighting to cars that are run at varying speeds, a governor has in many instances been made use of to open and close the electric circuit mechanically according to the speed of the car and governor, and switches operated both electrically and by hand have been employed having the same object in view.

In my present invention I make use of a polarized compound switch, the object of which is primarily to direct the current so that it may reach the field helices and the secondary battery in a uniform direction or polarity, and the secondary object of such polarized compound switch is to break the electric circuit when the speed of the car has lessened so that the electric energy developed by the dynamo has reached a minimum voltage and becomes less than that of the secondary battery, and I maintain a closed circuit through the armature commutator and polarized compound switch so that there will be a current developed by the residual magnetism of the field magnet when the car is started. The helices of the field magnets are compound and wound in such a manner that the current through one helix tends to neutralize the magnetism set up by the current through the other helix, and these two helices are in a constantly closed circuit, and the secondary battery is in a shunt to the field helices, which shunt also contains a circuit breaker actuated by an electro-magnet the helix of which is in a shunt to the armature, so that when the voltage of the dynamo sinks below the minimum point, the shunt circuit between the helices of the field magnets and the secondary battery is broken to prevent the discharge of the secondary battery through such helices. By this means the secondary battery energizes the electric lights and when the voltage of the dynamo is less than that of the secondary battery, the circuit between the secondary battery and the field helices is broken, and the field helices are wound with reference to developing a nearly uniform current through the armature circuit regardless of the speed at which the armature may be driven by its connection with the axle of the car, and whenever the voltage set up in the dynamo is in excess of that of the secondary battery the circuit through such secondary battery is closed for charging the same.

In the drawings, Figure 1 is a diagrammatic representation of the circuit connections and of the polarized compound switch. Fig. 2 is a section of the switch through the helices.

Let A represent the secondary or storage battery, and B the incandescent lights in multiple arc in the circuit that is connected with the poles of such secondary battery. The dynamo is to be of any desired character, and at C the armature thereof is represented, and D represents the field magnet, the coil 2 of which is of coarser wire than the coil 3, the sizes of the wires and the length of the same being properly proportioned so as to set up in the magnet D the magnetism required according to the varying speeds of rotation of the armature, as hereinafter set forth.

The polarized compound switch is made with a magnet E which is preferably of iron or steel and permanently polarized, and there is around one end of such magnet E a helix F through which the current passes in one direction, as hereinafter set forth, so as to maintain in the magnet E the necessary magnetic energy, and at opposite sides of the magnet E there are electro-magnets G and H, each magnet having a tubular iron core in which slides a guide pin 6 connected with the magnet E, such guide pin being of brass or other non-magnetic material, and within the tubular cores of the electro-magnets G and H there are springs 7 adjusted in their strength by the screws 8, and these springs 7 act at opposite ends of the guide pin 6, and the screws are to be so adjusted that the magnet E when not otherwise acted upon will remain in a central or neutral position between the two electro-magnets G and H, and upon the magnet E are circuit closers 9 10 11 12 contacting with springs 13 14 15 16 17 18 19 20, so that when the magnet E is moved bodily in one direction the circuit is closed by 9 between 13 and 14 and by 11 between 15 and 16, and when the magnet E is moved in the other direction, the circuit is closed by 10 between 19 and 20 and by 12 between 17 and 18.

I make use of a circuit closer I between the spring contacts 21 and 22, such circuit closer I being upon the armature K of the electro-magnet L, the helix of which is in a shunt between the brushes 4 and 5 of the commutator, and I make use of a block of carbon 23 or similar material of high resistance between the contact springs 21 and 22, so that when the circuit is broken by the spring 24 drawing back the armature K, there will not be any spark between the circuit closer I and its contact springs, the current passing through the block 23 of carbon or high resistance material.

The circuit from the brush 5 passes by the wire 25 through the helix of the electro-magnet L and back by the wire 26 to the brush 4. Hence whenever the speed of the car and of the armature C is sufficient to develop a current and magnetism that will overcome the spring 24, the contact I will close the circuit between 21 and 22, which circuit passes from the + pole of the secondary battery A to 21 by the wire 27 and from the − pole of the storage battery by the wire 28, field helix 3 and wire 29 to the spring 22, and a branch or shunt from the wire 29 passes through the helix of the magnet F and by the wire 30 to the spring 18, and there are cross wire connections 31 32 between the springs 14 and 18 and 15 and 19, and the helix 2 of the field D is in the circuit by the wire 33 from said field 2 to 14 and by 32, 18 and 30 to the helix of the magnet F, and there is a branch wire 34 from the wire 25 which divides as a coarse and fine winding 35 and 36 that passes through and forms the helices of the magnets G and H, the coarse wire 35 terminating at the spring 13 and the fine wire 36 terminating at the spring 16, and from said spring 16 is a connection to the spring 17 and thence to the wire 26. Hence it will be apparent that the fine wire 36 is in a closed circuit between the brushes 4 and 5, so that the current passes from 4 by 26 37 17 16 36 34 25 and 5, and the coarse wire 35 of the magnets G and H is in the main circuit between 13 and 20 that is open when the magnets G and H are not energized, and when the dynamo is at rest the circuit closer I is opened by the spring 24.

It is advantageous to apply a small coil 40 around the field magnet D in a shunt between the brushes 4 and 5 so as to be sure of setting up sufficient magnetism in the field magnet D for starting the dynamo, there being always a certain amount of residual magnetism, and as the current increases by the increased speed of the armature, the current passes either from 4 or 5 according to the direction of rotation of the armature through 25 L and 26, and the magnet L eventually becomes energized and closes the circuit between 21 and 22. During this time a current has been flowing through G and H by 25 34 36 16 17 and 37 and 26, energizing the magnets G and H, and the direction of the current and of the polarization of the cores of the magnets G and H will depend upon the direction in which the car is traveling and the direction of rotation of the armature C, and according to the polarity set up in the magnets G and H, so that the magnet E which is a polarized armature to said magnets G and H will be moved either in one direction or the other. If it is moved so that the circuit between 13 and 14 is closed by 9 and between 15 and 16 is closed by 11, then the current from the armature passes by 25, 34, 35, 13, 9, closing the return circuit from the battery A by 28 2 and 33 and 14 and the current also passes by 36 to 16 11 15 and by the wire 39 to its junction 48 with the wire 27 where the current divides, the principal portion of it going through and charging the secondary battery A, a small portion going through the contacts 21 I and 22, and by 29 through the helix 3 to the storage battery, thus energizing the field helices 2 and 3, and the current also divides passing through the helix F, which helix is of high resistance, so that only a small portion of the current passes through the same, and by the wire 30 to 18 and thence by 32 to 14 the circuit being closed through 14 13 and 35, as aforesaid. In this operation the helix F serves to maintain the proper polarity of the magnet bar E, and the current passing through the helices G and H of the polarized compound switch magnetizes the cores of G and H in such a direction as to cause the contacts 9 and 11 to be firmly held against the springs 13 14 15 and 16. If now the direction in which the railway car is traveling is reversed and the direction of rotation of the armature of the dynamo is also reversed, the direction of the currents passing through 25 and 26 will be changed and the polarity of the magnets G and H will be changed so that the armature magnet E will be moved in the opposite direction to close the circuit between 17 12 and 18 and 19 10 and 20 respectively, and the armature current will flow through 26 37 17 12 18 and the circuit will be closed through 30 and F to 29 and through 25 34 36 16 17 and 37 to 26 and through 35 13 20 10 19 31 15 and 39 to 27. Thereby the outgoing current will divide at 48 as before and pass through the secondary battery and through the helices of the field magnets without the direction of the current being reversed.

So long as the circuit is closed by I between 21 and 22, the current from the secondary battery will flow through 27 28 3 29 22 I 21 27 back to the secondary battery A. Thus the field helix 3, which is the main energizing helix of the dynamo, is in a shunt to the battery, and the current set up by the rotation of the armature of the dynamo will be supplied into that circuit and traverse through the storage battery energizing the storage battery, and where the lamps or other working devices are in operation in the working circuit of the storage battery, the current will pass through those in proportion to the relative resistances. The current however passing from the point 48 through 27 21 I 22 and 29 will pass through the field helix 3 in the opposite direction to that from the storage battery, and to that extent the variable electromotive force of the armature will act to neutralize the energy from the storage battery in the field helices and cut down the voltage of the armature in proportion, so that the output from the dynamo will be equal or nearly so regardless of the speed of the armature, and the current set up by the armature of the dynamo will also pass through the neutralizing coil 2, and the greater the electromotive force of the armature in consequence of the speed being increased, the greater neutralizing effect will be set up by the coil 2, thus rendering the action of the dynamo uniform or nearly so regardless of the speed of the same, the sizes of the wire and the lengths of the coils 2 and 3 being proportioned to effect this object in the well known manner. In these operations the circuit from the brushes through the magnet L is not interrupted, but as soon as the speed of the armature slows down so that the electromotive force thereof acting through the helix of the magnet L becomes insufficient to hold the closer I in contact with 21 22, the spring 24 breaks the circuit between 21 and 22, and the battery circuit through 27 21 22 29 3 and 28 is broken, thereby preventing the storage battery discharging through this circuit and allowing such storage battery to remain effective in energizing the lamps or other devices B in the working circuit. It will also be manifest that the storage battery is in a shunt circuit that is closed in either direction through 27 21 22 or in the other direction through 28 3 29 2 33 35 and 36 and that the current through 35 and 36 from the storage battery is the reverse of the current passing into 35 and 36 from the armature brushes.

Hence when the output or electromotive force of the armature is no greater than the electromotive force of the storage battery, the compound polarized switch becomes inert, and the springs that act upon the magnetic armature thereof bring such magnetic armature to the neutral point and break the circuit to the storage battery that passes through such polarized compound switch. Thereby the storage battery becomes the regulator both of the polarized compound switch and of the dynamo, and when the storage battery is fully charged the dynamo ceases to act, although the armature may continue to rotate.

I claim as my invention—

1. The combination with a dynamo adapted to be run at varying speeds and having reverse wound field helices and a secondary battery and working circuit, of circuit connections and a polarized compound switch having contacts in a circuit through one of the field helices of the dynamo to break such circuit when the electromotive force of the armature falls to that of the secondary battery, substantially as set forth.

2. The combination with the armature and reverse wound field helices in a dynamo and a secondary battery, of an electro-magnet and armature closing the circuit through the secondary battery and main field helices, the helix of the circuit closing magnet being in a closed shunt between the commutator brushes of the armature, and a polarized compound switch, one helix of which is in a closed shunt between the commutator brushes and the other helix of which is in a circuit that is made or broken by the switch, such circuit also passing through the secondary battery and the neutralizing coil of the field helices, substantially as set forth.

3. The combination with a dynamo having reverse wound helices, of a secondary battery and its working circuit, an electro-magnetic circuit closer having its helix in a closed shunt around the armature of the dynamo, a polarized compound switch, one helix of which is in another closed shunt to the armature circuit and the other helix of which is in a circuit that is closed and opened by the switch and contains the secondary battery and the neutralizing field helix, the circuit through the other field helix being closed by the electro-magnet in the armature shunt, substantially as set forth.

4. The combination with a dynamo having reverse wound helices, of a secondary battery and its working circuit, an electro-magnetic circuit closer having its helix in a closed shunt around the armature of the dynamo, a polarized compound switch, one helix of which is in another closed shunt to the armature circuit and the other helix of which is in a circuit that is closed and opened by the switch and contains the secondary battery and the neutralizing field helix, the circuit through the other field helix being closed by the electro-magnet in the armature shunt, and a helix to polarize the armature of the compound switch in a closed circuit containing the field helices, substantially as set forth.

5. The combination with the armature and reverse wound helices in a dynamo and a secondary battery and its working circuit, of an electro-magnet having its helix in a shunt between the brushes of the armature commutator, and a contact closed by the said electro-magnet and circuits containing the secondary battery and field helices, whereby the reduction of potential in the armature causes the contact to break all the circuit connections between the armature, the fields and the secondary battery, substantially as specified.

6. The combination with the armature and reverse wound helices in a dynamo and a secondary battery and its working circuit, of an electro-magnet having its helix in a shunt between the brushes of the armature commutator, a contact closed by the said electro-magnet and circuits containing the secondary battery and field helices, whereby the reduction of potential in the armature causes the contact to break all the circuit connections between the armature, the fields and the secondary battery, and a piece of carbon or other material of high resistance between the contact terminals, substantially as specified.

Signed by me this 4th day of May, 1894.

WILLIAM BIDDLE.

Witnesses:
GEO. T. PINCKNEY,
A. M. OLIVER.